United States Patent
Muller

[15] 3,679,054
[45] July 25, 1972

[54] FILTERING AND AERATING JET BREAKER

[72] Inventor: Jacques Muller, 123 Ave. du Genl. de Gaulle, La Garenne-Colombes, France

[22] Filed: May 21, 1970

[21] Appl. No.: 39,469

[30] Foreign Application Priority Data

May 30, 1969 France..................................6917683

[52] U.S. Cl..............................210/95, 210/266, 210/315, 210/449, 210/488, 261/78 A
[51] Int. Cl............................................................C02c 1/14
[58] Field of Search.....................261/78 A; 210/94, 95, 266, 210/315, 317, 449, 488

[56] References Cited

UNITED STATES PATENTS

| 719,309 | 1/1903 | Davis | 210/449 X |
| 736,107 | 8/1903 | Johnston | 210/94 |
| 1,677,892 | 7/1928 | Herbert et al | 210/488 |
| 2,643,104 | 6/1953 | Holden | 210/449 X |

Primary Examiner—S. Leon Bashore
Assistant Examiner—Robert L. Lindsay, Jr.
Attorney—Arthur B. Colvin

[57] ABSTRACT

This invention relates to a filtering and aerating jet filter comprising a filter cartridge formed by a stack of grooved washers positioned in a chamber for flow of water under pressure through the stack of washers and out of the outlet of the device. The outlet has an associated port for entry of air into the filtered jet of water to aerate the latter. The chamber in which the stack is positioned is designed to contain a deodorizing substance to remove odors from the water and the device is designed so that it may readily be disassembled and also may be cleaned without disassembling by having a reverse flow of water therethrough.

4 Claims, 3 Drawing Figures

FILTERING AND AERATING JET BREAKER

It is among the objects of the invention to provide a filtering and aerating jet-breaker which is relatively simple in construction and may readily be disassembled for replacement of its parts, which incorporates a filter cartridge to remove impurities or particles from the jet of water passing therethrough and which has an associated chamber encompassing the filter cartridge in which a deodorizing substance may be positioned to remove undesirable odors from the unit, which unit may be cleaned without disassembly by forcing the jet of water therethrough in reverse direction.

According to the invention, these objects are accomplished by the arrangement and combination of elements hereinafter described and more particularly recited in the claims.

In the accompanying drawings in which are shown one or more of various possible embodiments of the several features of the invention, FIG. 1 is a longitudinal view partly in cross section of the device;

Figure 1:
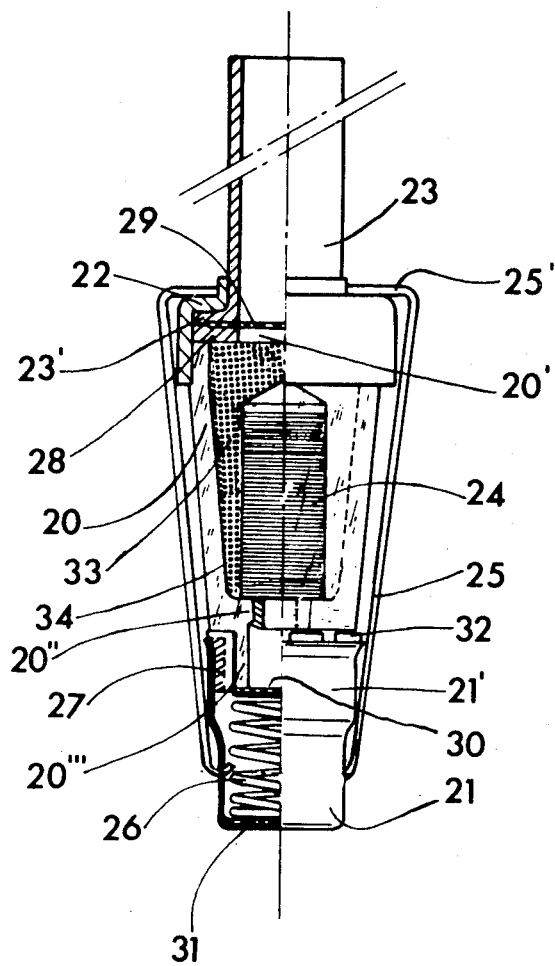
Figure 2:
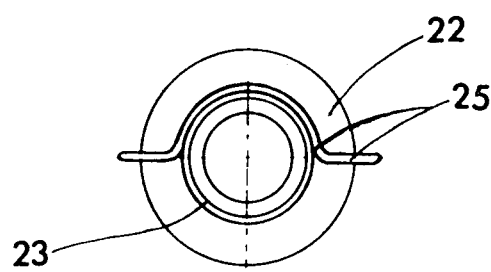
FIG. 2 is a top plan view of the device.

Referring now to the drawings, as shown in FIGS. 1 and 2, the device comprises a hollow body 20 substantially frusto-conical in shape of larger diameter at its upper end. Ferrule 21 is positioned at the lower end of the hollow body 20 and a cupshaped connecting member 22 is positioned at the upper end of the hollow body 20 with the side wall of the connecting member encompassing such upper end. A flexible tubular connector 23 in the form of a pipe for example, has one end positioned in the cupshaped connecting member and its other end is adapted to be connected to a faucet for example.

Positioned in the hollow body 20 and extending axially thereof is a filtering cartridge 24 which consists of a stack of washers each having radiating grooves extending from the outer periphery of each washer to a central opening in each washer, said central opening when the washer is assembled defining an axial passageway through which the water may flow.

More specifically, the passageway is closed at its upper end and open at its lower end.

The elements above described are retained in assembled position by means of a stirrup 25, the cross piece 25' at the upper end thereof reacting against the top wall of the cup-shaped connecting member, the lower end of the legs of said stirrup 25 being hooked into the ferrule 21. A coil spring 26 positioned in the ferrule 21 reacts against the inturned rim at the lower end of the ferrule 21 and against the lower end of the hollow body 20 resiliently to retain the elements assembled. The ferrule 21 is designed to slide over a ring 27 encompassing the reduced diameter lower end 20''' of said hollow body 20.

A fine mesh screen 31 is also positioned against the inturned lower end of the ferrule to cover the opening therethrough. A washer 28 is positioned in the cup-shaped connecting member 22 resting on the upper end of the hollow body 20, said washer supporting a fine mesh screen 29 positioned between said washer 28 and a collar 23' formed at the lower end of tubular connector 23.

The hollow body 20 preferably is formed of a transparent material such as plastic or glass being open as at 20' at its upper end and defining a shoulder 20'' near its lower end which supports the axial filter cartridge or stack 24. The ring 27 encompasses the reduced diameter portion 20''' which defines the outlet for liquid from the hollow body, said ring having a plurality of air inlets 32 arranged in its circumference leading from the exterior of the unit into the interior of the ferrule, the latter being of greater diameter at its upper portion 21' to facilitate the suction of air from the exterior into the liquid passing through the ferrule. A mesh screen 30 is positioned against the lower end of the reduced diameter portion 20''' being retained thereagainst by the coil spring 26.

As shown in FIG. 1, the portion of the hollow body 20 encompassing the filter cartridge 24 is spaced therefrom to define an annular chamber 33 for a suitable deodorizing material 34 positioned in said chamber. The material may be granulated activated charcoal to remove the odor of chlorine which may be present in the water or other chemical may be employed depending upon the nature of the odor to be neutralized.

By reason of the fact that the hollow body 20 is transparent, it is possible to observe the reduction of activity of the deodorizing product by its change of color which indicates when it has become saturated. A new charge of deodorizing chemical may be inserted into the unit by removing the stirrup 25 to disengage the body of the device.

Figure 3:
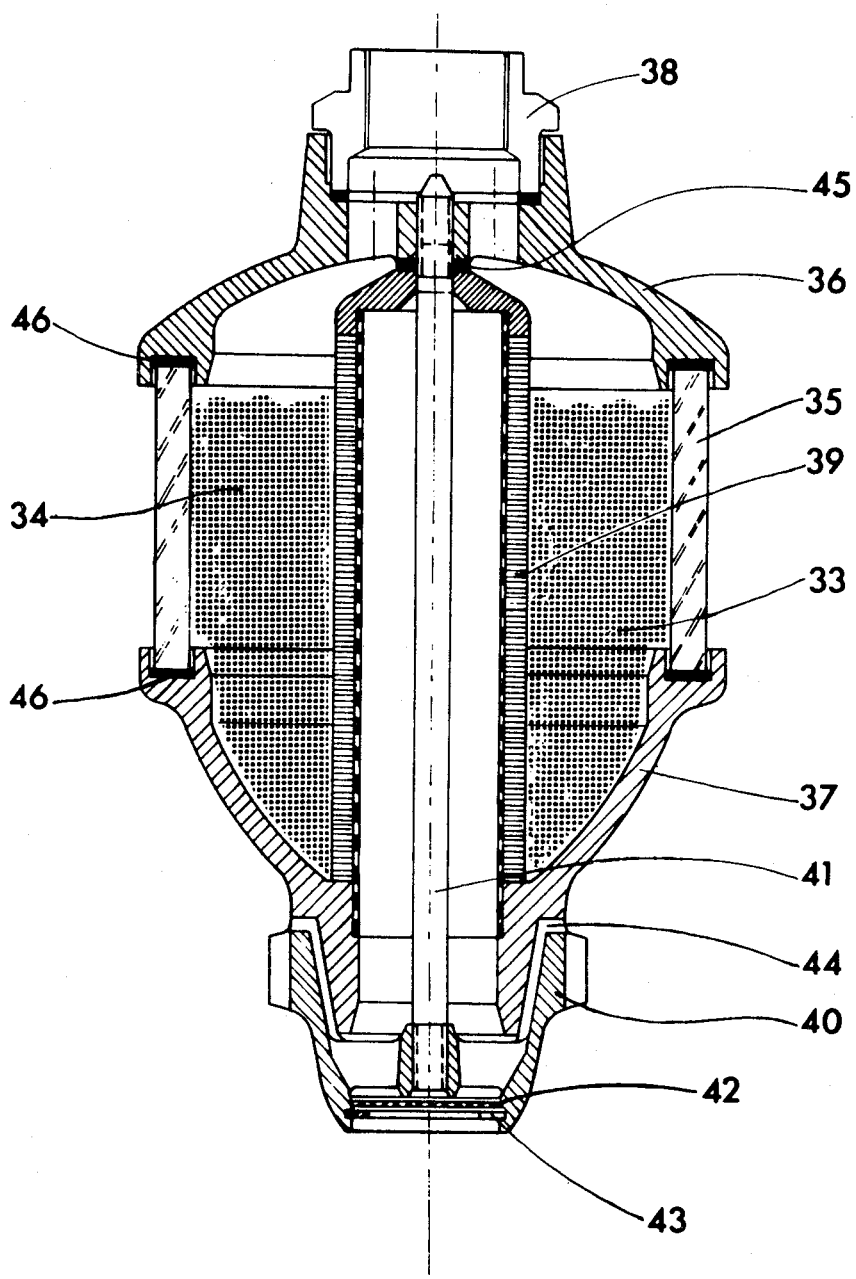
FIG. 3 is a longitudinal sectional view of another embodiment of the invention.

In the embodiment shown in FIG. 3, the device has a much larger capacity.

More particularly, the body 35 of the device shown in FIG. 3 is a cylindrical transparent tube of glass or plastic positioned between two opposed caps 36 and 37. Cap 36 has a central opening to which a liquid inlet pipe may be connected by means of a coupling 38. Cap 37 serves as a support for a filtering cartridge 39 which also is formed from grooved discs having a central opening defining an axial passageway when a stack of such discs is retained in position. The cap 37 has a central opening at its lower end to which a ferrule 40 is mounted. A central stem 41 rigid with the ferrule and extending axially thereof screws into an appropriately threaded boss in the cap 36 to hold the elements together.

A seal is provided between the cylindrical body 35 and the caps 36 and 37 by means of gaskets 46. The ferrule 40 has a filter screen 42 at its lower end retained in position by an inturned rim 43. Suitable air passageways 44 are provided adjacent the upper end of the ferrule 40 whereby air from the exterior may be drawn into the unit by reason of the suction effect created by the flow of water therethrough. The upper end of the stack of washers is closed by a suitable cap and a gasket 45 provides a seal. The side walls of the caps 36 and 37 and the cylindrical body 35 are spaced from the filter cartridge 39 to define a chamber 33 in which suitable deodorizing chemicals 34 may be positioned.

In the operation of the devices above described, with the coupling pipe connected to a faucet, a stream of water under a relatively high velocity will flow into the chamber in which the deodorizing chemical is positioned and then flow through the microgrooves in the filter cartridge; through the central passageway thereof and then be discharged through the mesh screen at the lower end of the ferrule. As the result of the flow of liquid under high velocity past the air inlets associated with the ferrule, air will be drawn from the exterior to mix with the stream of water and aerate the latter.

The stack of washers forming the filter is of conventional type and by reason of the grooves, any particles which are discharged from the faucet will be restrained from passing through the grooves into the central passageway therethrough. By reason of the deodorizing chemical, undesirable odors will be removed and the transparent casing will permit ready observation of the color of the chemicals so that when such color changes to indicate saturation, the chemical may readily be replaced by either removing the stirrup in the embodiments of FIGS. 1 or 2 or by unscrewing the central stem in the embodiment shown in FIG. 3.

Where it is desired to clean the device to remove the impurities restrained by the filter cartridge, it is merely necessary to disconnect the device from the faucet and force water under high velocity in reverse direction through the ferrule and thence through the central passageway in the cartridge which in turn will cause the water to flow in reverse direction through the grooves to clean the latter and discharge the impurities from the chamber through the normal inlet of the device.

Having thus described my invention, what I claim as new and desire to secure by Letters Patent of the United States is:

1. A filtering and aerating jet breaker comprising a hollow body having an inlet at one end and an outlet at the other end, means for connecting the inlet to a faucet, a filter cartridge positioned in said hollow body and extending axially thereof, said hollow body encompassing said cartridge and being spaced therefrom to define a chamber, said filter cartridge comprising a stack of juxtaposed washers each having radiating grooves on at lest one surface thereof and a central opening therein, said openings defining a central passageway closed at its upper end adjacent the inlet and open at its other end, through which liquid may flow from the inlet into said hollow body and through said grooves into said passageway to the outlet, a plurality of air inlet ports adjacent said outlet for admission of air from the exterior into the jet of water passing through said cartridge, and a charge of granulated deodorizing chemicals in said chamber.

2. The combination set forth in claim 1 in which said hollow body comprises a central portion in the form of a frusto-conical member of transparent material, a cup-shaped connecting member positioned on one end of said central portion, a hollow ferrule positioned on the other end of said central portion and a stirrup having a cross member resting against said cup-shaped connecting member and having the ends of its legs detachably connected to said ferrule, resilient means being positioned in said ferrule releasably to retain said elements in locked position.

3. The combination set forth in claim 2 in which said central member is substantially frusto-conical in shape having a reduced diameter portion at its lower end, a ring encompassing said reduced diameter portion, said ring having a plurality of circumferentially spaced air passageways therethrough, said ferrule encompassing said ring.

4. The combination set forth in claim 3 in which a mesh screen is positioned against the end of said reduced diameter portion, a second mesh screen is positioned at the end of said ferrule and said resilient member is a coil spring positioned in said ferrule and reacting against said screens to retain the latter in position.

* * * * *